United States Patent [19]
Ogiso et al.

[11] 3,906,523
[45] Sept. 16, 1975

[54] DEVICE FOR PHOTOGRAPHING RECORDING DATA ONTO THE FILM IN A PHOTOGRAPHIC CAMERA

[75] Inventors: Mitsutoshi Ogiso, Kawasaki; Shohei Ohtaki, Machida, both of Japan

[73] Assignee: Canon Kabushiki Kaisha, Tokyo, Japan

[22] Filed: Oct. 1, 1973

[21] Appl. No.: 401,974

[30] Foreign Application Priority Data
Oct. 3, 1972  Japan .............................. 47-99221

[52] U.S. Cl. .............................................. 354/109
[51] Int. Cl. .......................................... G03b 17/24
[58] Field of Search .................... 95/1.1; 354/109.7

[56] References Cited
UNITED STATES PATENTS
1,723,926  8/1929  Fairchild ............................... 95/1.1

*Primary Examiner*—John M. Horan
*Attorney, Agent, or Firm*—Toren, McGeady and Stanger

[57] ABSTRACT

The device for photographing recording data such as the date onto the film in a photographic camera of this invention comprises a detachable rear cover provided with a light source, data bearing means adapted to be illuminated by the light source and light conducting means for conducting the data bearing light from the data bearing means from the rear side of the film in the camera onto the marginal portion of the image on the film, and a connecting means detachably mountable in the camera body for introducing at least an energization control signal of the light source. The light source and the energization control means for the light source are located on the rear cover while high-voltage inhibiting means is provided on the rear cover for preventing the false function as well as breakage of the circuit of the light source which might occur due to the high voltage from a flash device connected to the synchronization terminals of the camera when the connecting means is attached to the synchronization terminals.

8 Claims, 6 Drawing Figures

3,906,523

DEVICE FOR PHOTOGRAPHING RECORDING DATA ONTO THE FILM IN A PHOTOGRAPHIC CAMERA

BACKGROUND OF THE INVENTION

This invention relates to a device for photographing recording data such as the date onto the film in a photographic camera from the rear side of the film, and, more particularly to improvements in a device for photographing recording data onto the film in a camera in which the synchronization contact of the camera is utilized for starting the data photographing device and the proper exposure is obtained by means of a timer circuit.

A device for photographing recording data such as the date of photographing onto the rear side of the camera from the rear side of the camera by the light from the built-in light source was well known. And in such a device, the starting of the data photographing device has heretofore been carried out by utilizing the synchronization contact of the camera. When the device of the above described bype is used in the flash photography utilizing a flash device, a high voltage at the side of the flash device, for example, electronic flash device, might be applied to the data photographing device through the synchronization contact of the camera thereby resulting in failure in the device. Therefore, it has been difficult to use the data photographing device together with the flash device. That is, when an electronic flash device is connected to the synchronization contact of the camera, the high voltage charged in the main capacitor is applied to the synchronization contact. Therefore, when a data photographing device having built-in transistor-timer circuit and the like therein is connected to the synchronization contact thus applied with the high voltage, the high voltage might be applied to the timer circuit thereby resulting in breakage of the transistor and the like. Therefore, it has been in general impossible to use both devices together in order to carry out the data photographing during the synchronization photography.

SUMMARY OF THE INVENTION

The object of this invention is to provide a device for photographing recording data in a photographic camera in which the above described disadvantages are avoided and which permits the data photographing to be carried out when the synchronization photography is effected by using an electronic flash device.

By this invention, even though a high voltage applied to the synchronization contact of the camera is applied to the data photographing device, the false function or the breakage of the timer circuit of the device is positively prevented.

DETAILED DESCRIPTION OF THE PREFERRED EMBODIMENT

Figures 1, 2:
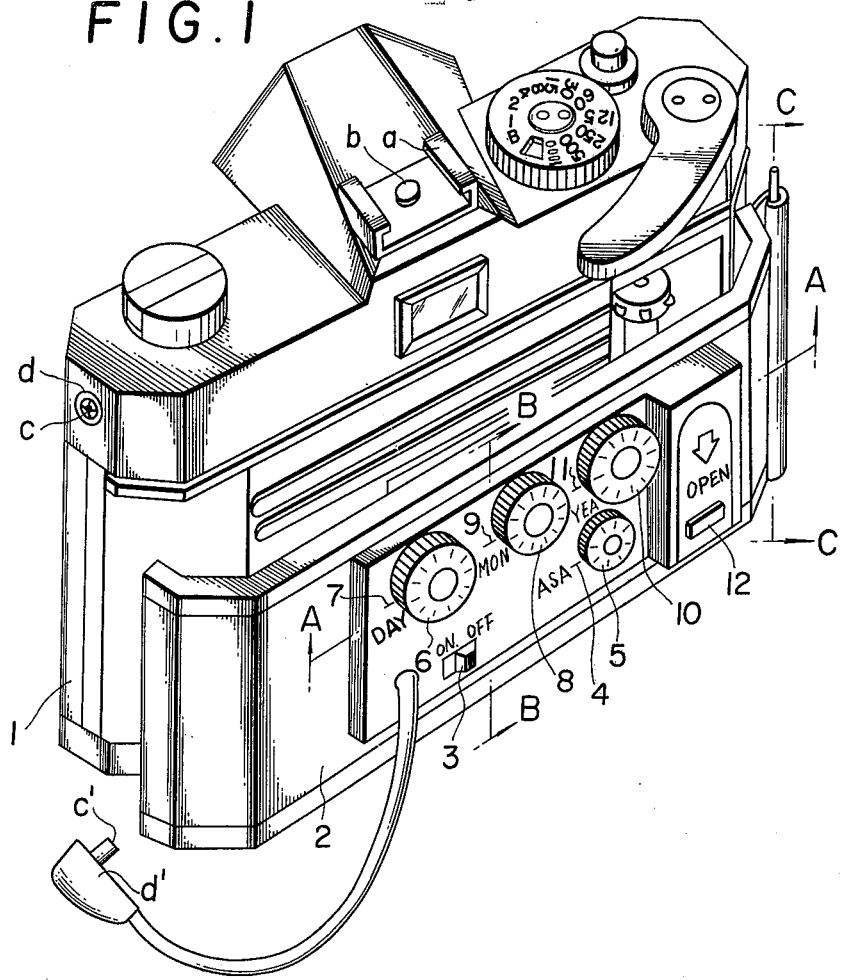
FIG. 1 is a perspective view showing the device for photographing recording data constructed in accordance with this invention, the device being shown as mounted on the rear side of the camera.
FIG. 2 is a sectional view taken along line C — C of FIG. 1 and showing the mechanism for detachably mounting the data photographing device on the camera body.

Referring to the drawings, the drawings show the device for photographing recording data onto the film in a photographic camera from the rear side thereof. FIG. 1 is a perspective view showing the data photographing device attached to the rear side of the camera. As shown in the figure, the device is attached to the rear side of the camera in place of the usual rear cover of the camera. In the figure, reference numeral 1 designates a camera body, 2 a rear cover having the device for photographing data, 3 a switch for the electric source of the data photographing device, 4 an index mark for indicating the film sensitivity, 5 a graduated disc for use with the index mark 4, 6, 8 and 10 designating data setting index discs, respectively, 7, 9 and 11 designating index marks for use with data setting index discs 6, 8 and 10, respectively, and 12 designating a chamber for housing a battery serving as the electric source. The rear cover 2 constructed as described above is adapted to be mounted on the camera body 1 by means of detachable mounting as shown in FIG. 2. In FIG. 2, 13 designates manipulating pin, 14 a slide pin, 15 a spring, 16 designating a fixedly secured pin.

Figure 3:
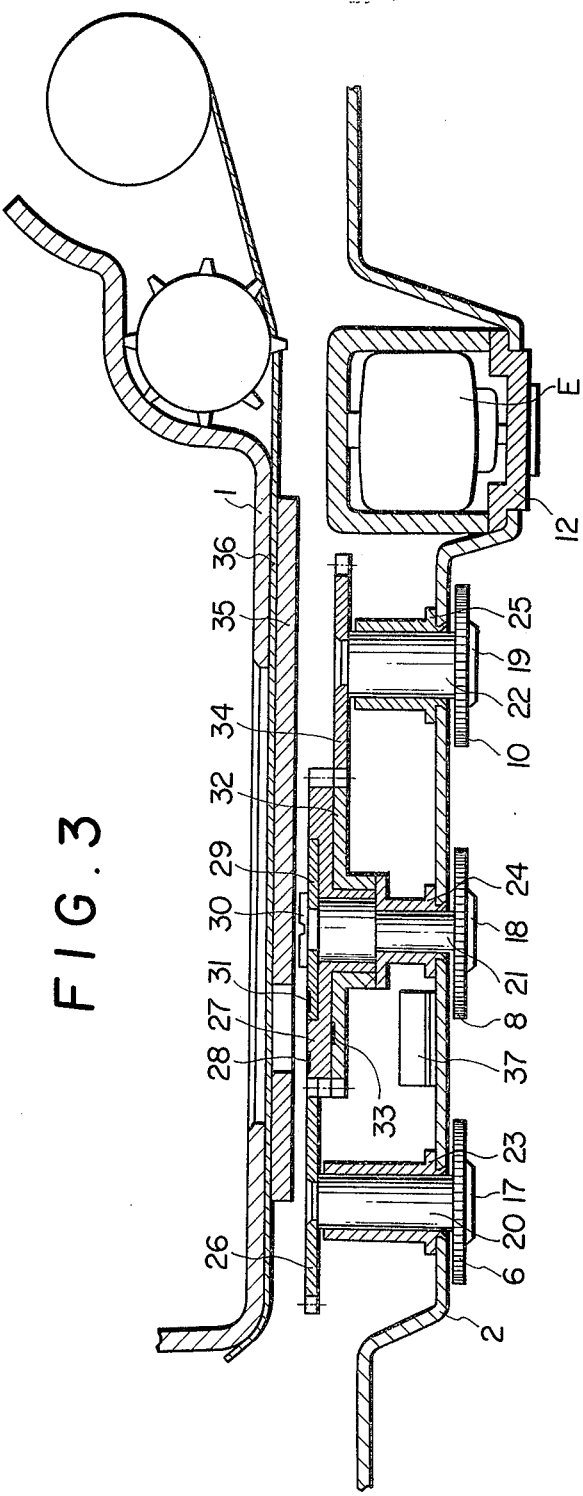
FIG. 3 is a sectional view taken along line A — A of FIG. 1 and showing actuating portions of the device shown in FIG. 1.
Figure 4:
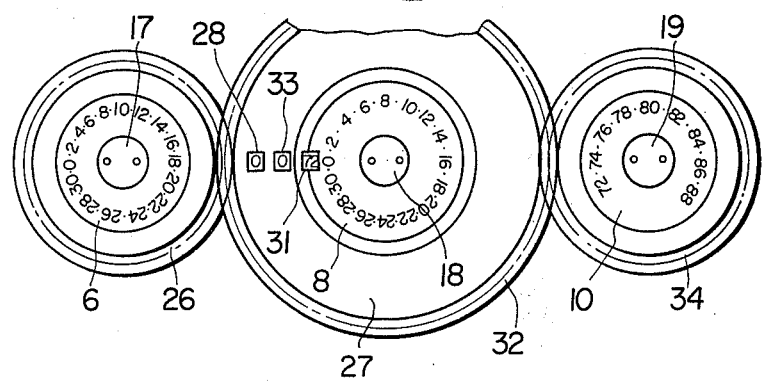
FIG. 4 is a view showing the arrangement of the graduated discs shown in FIG. 3.

FIGS. 3 and 4 show the cross-section along line A — A of FIG. 1 and the construction of the data setting index discs, respectively. In the figures, 17, 18 and 19 designate set screws for the data setting index discs, 20, 21 and 22 designating shafts for the respective index discs, 23, 24 and 25 bearings for the respective shafts, 26 a data setting gear, 27 a gear bearing thereon characters to be photographed onto the film, 28 characters on the gear 27, 29 designating a disc bearing thereon characters to be photographed onto the film, 30 a set screw for mounting the gear 27 and the disc 29 on the shaft 21, 31 designating characters on the disc 29, 32 a gear bearing thereon characters to be photographed onto the film, 33 characters on the gear 32, gear 32 being mounted on the gear 27 and, hence, on the shaft 21 by the set screw 30, 34 designating a data setting gear mounted on the shaft 22, 35 a pressure plate for the film, 36 the film, E designating a battery of the electric source, while 37 designates a reflecting mirror.

Figure 5:
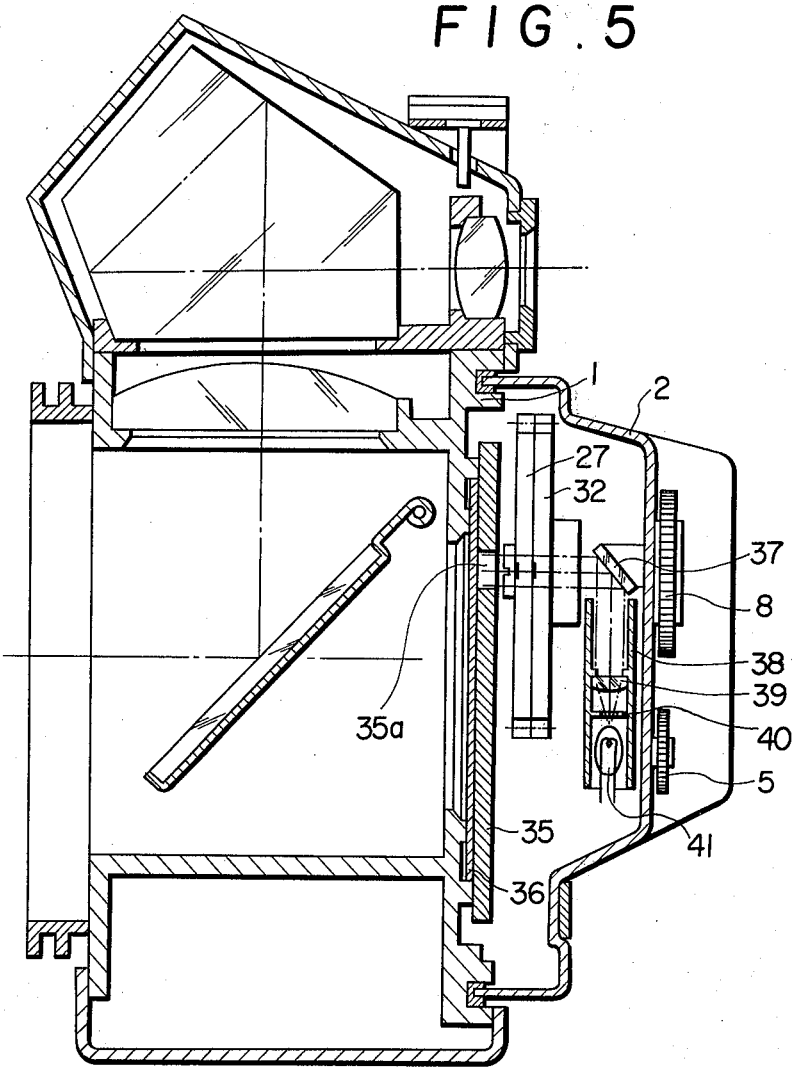
FIG. 5 is a sectional view taken along line B — B of FIG. 1.

Next, FIG. 5 is a sectional view taken along line B — B of FIG. 1 and showing the data photographing device when it is attached to the camera. The parts in FIG. 5 which are similar to those shown in FIGS. 1 – 4 are shown by the same reference numerals shown in FIGS. 1 – 4. 38 designates a light guiding member, 39 designating a lens, 40 a pin hole, 31 a lamp forming the light source, and 35a designating a hole in the pressure plate.

Figure 6:
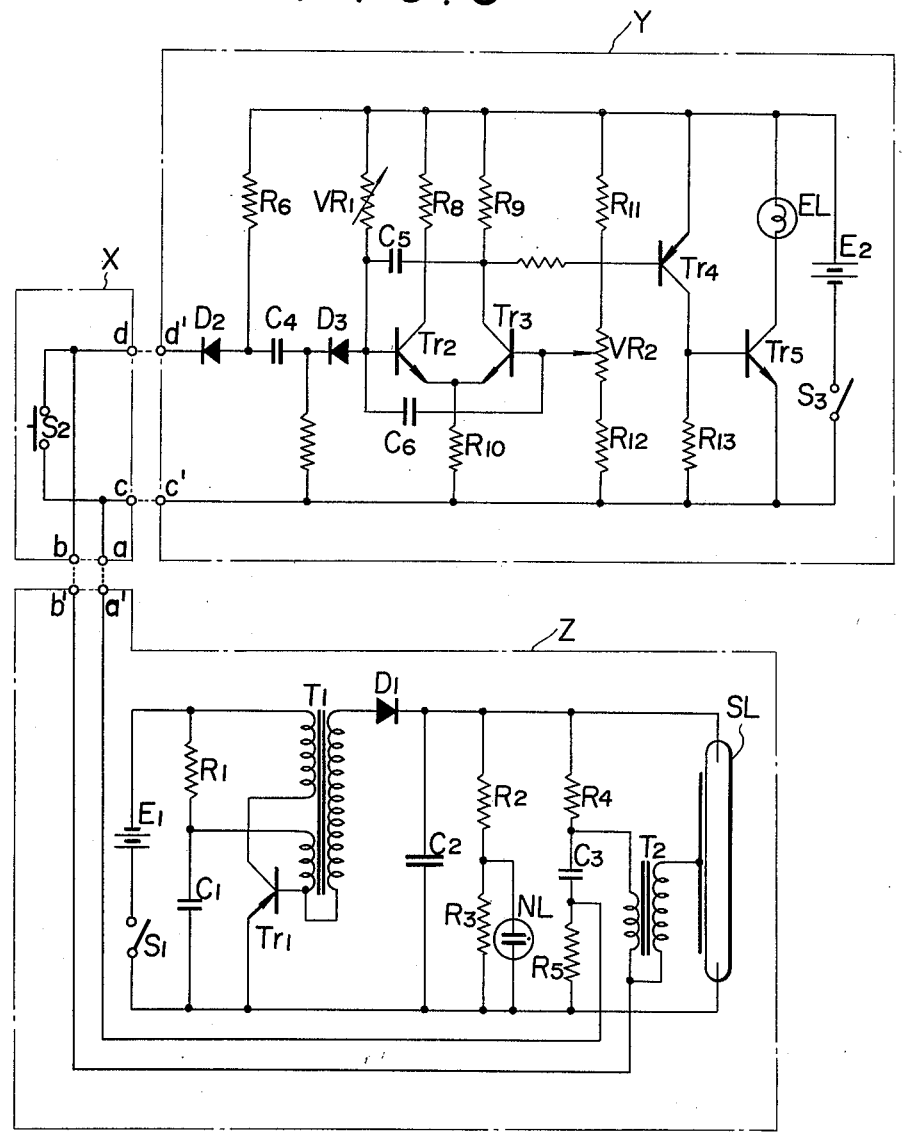
FIG. 6 is a wiring diagram showing the connection of the circuits of the data photographing device according to this invention and an electronic flash device, when they are used in combination.

FIG. 6 shows a wiring diagram showing the connection of the data photographing device and an electronic flash device to a camera when they are used together.

The area X encircled by chain dot line shows the camera body, the area Y showing the data photographing device while the area Z shows the electronic flash device. These devices are connected to the camera body by plugs $a'$, $b'$, $c'$, $d'$ thereof which are connected to the terminals $a$, $b$, $c$, $d$ of the camera body.

The operation of the data photographing device of this invention will be described below. The film sensitivity setting disc 5 is rotated according to the sensitivity of the film used so that the index mark 4 is registered with the set character on the disc 5 thereby permitting the film sensitivity to be set by varying VR1 in FIG. 6. Next, by setting data setting discs 6, 8, 10 with respect to the respective index marks 7, 9, 11, the data setting disc 6 rotates the gear 27 through gear 26 so that the desired character 28 is set to the data photographing position, disc 8 directly rotating disc 29 so that the desired character 31 is set to the data photographing position while the data setting disc 10 rotates the gear 32 through the gear 34 so that the desired character 33 is set to the data photographing position. In the photographing where the the electronic flash device Z is not used, synchronization contacts $S_2$ of the camera are connected to the time circuit by inserting plugs $c'$, $d'$ into the terminals $c$, $d$. Under such conditions, when the switch $S_3$ of the electric source is put on, transistor $Tr_2$ of the timer circuit is rendered to be ON, while transistors $Tr_3$, $Tr_4$ and $Tr_5$ are made OFF and the lamp EL for the data photographing is extinguished. Then, by pushing the shutter button, the shutter is opened and the synchronization contacts are closed. Thus, the base voltage of the transistor $Tr_2$ is made zero so that the transistor $Tr_2$ of the timer circuit is rendered to be OFF while the transistors $Tr_3$, $Tr_4$ and $Tr_5$ are rendered to be ON thereby energizing the lamp EL. When the transistor $Tr_2$ is made OFF and the transistor $Tr_3$ is rendered to be ON, the electric charge stored in the capacitor $C_5$ is discharged through $R_1$ and $VR_1$, and, at the same time, it is charged through the circuit formed by $VR_1 - C_5 - Tr_3 - R_{10}$, thereby resulting in gradual rise in the base voltage of the transistor $Tr_2$. When the base voltage of the transistor $Tr_2$ reaches a predetermined value, the transistors in the timer circuit are again switched so that the lamp EL is extinguished. Therefore, by varying the value of $VR_1$ according to the film sensitivity, for example, the duration of energization of the lamp can be varied. When the lamp EL (41) is energized, the light therefrom passes through the pin hole 40 and collimated by the lens 39 to provide a parallel light beam which is reflected by the mirror 37 to change the direction at right angle so that it illuminates the characters for the data recording located adjacent to the film. The light passing around the characters passes through the hole 35a in the pressure plate and reaches the rear side of the film thereby permitting the characters to be photographed onto the film. In this case, since the light from the point light source is made a parallel light beam by means of the lens 39 and the parallel light beam passes through the silhouette in the transparent data bearing support so as to project the silhouette onto the film surface, the set position of the data bearing support which is arranged opposite to the film surface can be freely varied.

When the data photographing device is used in coupled relation with the electronic flash device so as to carry out flash photography, the plugs $a'$, $b'$ of the flash device Z are connected to the terminals $a$, $b$ of the camera body. By this connection, the plugs $c'$, $d'$ of the data photographing device Y and the plugs $a'$, $b'$ of the flash device Z are connected to the synchronization contacts $S_2$ in parallel relation with each other. Under such conditions, when the switch $S_1$ of the electric source of the flash device is closed, the main capacitor $C_2$ is charged by the DC boosting circuit comprised of the transistor $Tr_1$ and other elements. The high voltage of the capacitor $C_2$ thus charged is applied to the input plugs $c'$, $d'$ through $R_4$, $T_2$, $R_5$ of the trigger circuit. In the device of this invention, a diode $D_2$ is connected in series between the input plug $d'$ and the input of the timer circuit in the reverse direction, so that the high voltage from the flash device is prevented from being applied to the timer circuit by utilizing the impedance in the reverse direction obtained by the diode $D_2$.

By the measure as described above, the timer circuit is prevented from damage or false function caused by the high voltage of the flash device even though the flash device is used together with the data photographing device by connecting them simultaneously to the synchronization circuit of the camera. Therefore, by connecting the flash device and the data photographing device to the camera as shown in FIG. 6, the flash photography and the data photographing can be carried out simultaneously by closing the synchronization switch $S_2$ by actuating the shutter button.

As described above, the data photographing device of this invention can be operated together with the electronic flash device by connecting them to the synchronization switch circuit of the camera without any failure or damage. The data photographing is also possible in the usual photography without using a flash device. Therefore, this invention provides a very convenient device.

What is claimed is:

1. For a camera having a shutter and a selectively coupleable flash arrangement and a synchronizing switch that responds to the shutter for operating the flash arrangement, a system for entering data onto film in the camera in addition to the image of the object being photographed, comprising variable data carrying means for exhibiting variable data, an energizable light source for illuminating the data on the carrying means when the light source is energized, optical means for directing the illuminated data onto the film in the camera, a control circuit responsive to the synchronizing switch for energizing the light source in response to actuation of the switch so as to record data on the film, and electrical circuit means between the synchronizing switch and the control circuit for preventing large voltages in the flash arrangement from affecting the control circuit when the synchronizing switch actuates the control circuit and the flash arrangement simultaneously, said electrical circuit means including a component having a nonlinear electrical characteristic.

2. An apparatus as in claim 1, wherein said component includes a diode having a direction of easy current flow and a direction of hard current flow, said diode being connected to prevent current flow from a flash arrangement to said control circuit through said synchronizing switch.

3. A device as in claim 1, wherein said light source and said data carrying means and said optical means as well as said control circuit and said nonlinear means are mounted on the camera.

4. An apparatus as in claim 3, wherein said nonlinear means includes a diode having a direction of easy current flow and a direction of hard current flow, said diode being connected to prevent current flow from a flash arrangement to said control circuit through said synchronizing switch.

5. An apparatus as in claim 1, wherein said camera includes a detachable back cover, and said data carrying means and said light source as well as said optical means and said control circuit are mounted within the back cover.

6. A device as in claim 5, wherein said component includes a diode having a direction of easy current flow and a direction of hard current flow, said diode being connected to prevent current flow from a flash arrangement to said control circuit through said synchronizing switch.

7. A flash camera arrangement, comprising a camera having a shutter, a synchronizing switch responsive to actuation of the shutter, a flash arrangement actuated by said synchronizing switch and coupled with the camera, variable data carrying means forming a part of the camera for exhibiting selectively entered data, and actuable light source forming a part of the camera for illuminating data on the carrying means when the light source is actuated, optical means for directing the illuminated data onto film in the camera, a control circuit forming a part of the camera and responsive to the synchronizing switch for energizing the light source in response to actuation of the switch so as to record data on the film, and electrical means between the synchronizing switch and the control circuit for preventing large voltages in said flash arrangement from affecting the control circuit, said electrical circuit means including a component having a nonlinear electrical characteristic.

8. A system as in claim 4, wherein said nonlinear means includes a diode having a direction of easy current flow and a direction of hard current flow, said diode being connected to prevent current flow from a flash arrangement to said control circuit through said synchronizing switch.

* * * * *